United States Patent
Nitta

(10) Patent No.: US 10,739,560 B2
(45) Date of Patent: Aug. 11, 2020

(54) IMAGING LENS

(71) Applicant: KANTATSU CO., LTD., Yaita-shi, Tochigi (JP)

(72) Inventor: Koji Nitta, Tokyo (JP)

(73) Assignee: KANTATSU CO., LTD., Yaita (JP)

( * ) Notice: Subject to any disclaimer, the term of this patent is extended or adjusted under 35 U.S.C. 154(b) by 42 days.

(21) Appl. No.: 15/875,447

(22) Filed: Jan. 19, 2018

(65) Prior Publication Data
US 2019/0011672 A1  Jan. 10, 2019

(30) Foreign Application Priority Data
Jan. 20, 2017 (JP) .................. 2017-008798

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC ...... G02B 13/0045; G02B 13/18; G02B 9/62; G02B 15/177; G02B 15/173
USPC ......................................... 359/713
See application file for complete search history.

(56) References Cited

U.S. PATENT DOCUMENTS

| | | | |
|---|---|---|---|
| 2012/0243108 A1 | 9/2012 | Tsai et al. | |
| 2013/0314804 A1 | 11/2013 | Kubota et al. | |
| 2013/0335834 A1 | 12/2013 | Tsai et al. | |
| 2015/0138431 A1 | 5/2015 | Shin et al. | |
| 2015/0153546 A1 | 6/2015 | Tang et al. | |
| 2015/0247993 A1* | 9/2015 | Ishizaka ............ | G02B 13/0045 359/708 |
| 2015/0268446 A1 | 9/2015 | Chen et al. | |
| 2016/0356989 A1 | 12/2016 | Kubota et al. | |

FOREIGN PATENT DOCUMENTS

JP  2012-155223 A  8/2012

* cited by examiner

*Primary Examiner* — Mohammed A Hasan
(74) *Attorney, Agent, or Firm* — Oliff PLC

(57) ABSTRACT

There is provided an imaging lens with high resolution which satisfies in well balance low-profileness, wide field of view and low F-number. An imaging lens comprises in order from an object side to an image side, a first lens being double-sided aspheric lens, a second lens having positive or negative refractive power, an aperture stop, a third lens having positive refractive power, a fourth lens having at least one aspheric surface and negative refractive power, a fifth lens having at least one aspheric surface and positive or negative refractive power, and a sixth lens being double-sided aspheric lens and having positive refractive power, wherein an image-side surface of said sixth lens is a concave surface facing the image side near the optical axis and is formed as the aspheric surface, which changes from the concave surface to the convex surface at an area apart from the optical axis.

12 Claims, 10 Drawing Sheets

IMAGING LENS

The present application is based on and claims priority of Japanese patent application No. 2017-008798 filed on Jan. 20, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact imaging device.

Description of the Related Art

In recent years, a camera is mounted in much information equipment. Furthermore, it becomes indispensable as function of the product to add camera function to the mobile phone including the smartphone. Furthermore, development of products with camera function is made accordingly.

The imaging lens mounted in such equipment is required to be compact and to have high-resolution performance. For example, the following Patent Document 1 and Patent Document 2 disclose an imaging lens comprising six lenses.

Patent Document 1 (JP 2012-155223A) discloses an imaging lens comprising, in order from an object side, a first lens group having positive refractive power, a second lens group having negative refractive power, a third lens group having positive refractive power, a fourth lens group having negative refractive power, a fifth lens group having positive refractive power, and a sixth lens group negative refractive power.

Patent Document 2 (US2012/0243108A) discloses an imaging lens comprising, in order from an object side, a first lens having a convex surface facing the object side and positive refractive power, a second lens, a third lens, a fourth lens having at least one aspheric surface, a fifth lens having a convex surface facing the object side and a concave surface facing an image side, and a sixth lens having concave surfaces facing the object side and the image side and having at least one aspheric surface.

However, when low-profileness, wide field of view and low F-number are realized, it is very difficult to correct aberration at a peripheral area, and excellent optical performance is not obtained.

The present invention has been made in view of the above problems, and an object of the present invention is to provide an imaging lens with high resolution which satisfies in well balance the low-profileness, the wide field of view and the low F-number and excellently corrects aberrations.

Herein, "Low-profile" implies that a ratio (TTL/2ih) of total track length (TTL) to diagonal length of an effective image plane of an image sensor (2ih) is less than 1.0, "wide field of view" implies that a field of view is 90 degrees or more, and "low F-number" implies that the F-number is F2.4 or less.

Regarding terms used in the present invention, a convex surface or a concave surface of lens surfaces implies that a shape of the lens surface near an optical axis (paraxial portion), and unless otherwise noted, refractive power implies the refractive power near the optical axis (paraxial portion). The pole point implies an off-axial point on an aspheric surface at which a tangential plane intersects the optical axis perpendicularly. The total track length is, for example, defined as a distance along the optical axis from an object-side surface of an optical element located closest to the object side to an imaging plane, when thickness of an IR cut filter or a cover glass located between the imaging lens and the image plane of the image sensor is regarded as an air.

An imaging lens according to the present invention comprises in order from an object side to an image side, a first lens being double-sided aspheric lens, a second lens having positive or negative refractive power, an aperture stop, a third lens having positive refractive power, a fourth lens having at least one aspheric surface and negative refractive power, a fifth lens having at least one aspheric surface and positive or negative refractive power and a sixth lens being double-sided aspheric lens and having positive refractive power, wherein an image-side surface of the sixth lens is a concave surface facing the image side near the optical axis and is formed as the aspheric surface, which changes to the convex surface at an area apart from the optical axis.

By using the double-sided aspheric lens, the first lens makes it possible to excellently correct aberration from a center to an off-axial area even for a wide field of view.

By having refractive power, the second lens excellently corrects spherical aberration and coma aberration occurred at the first lens.

It is preferable that the second lens has a meniscus shape having a concave surface facing the image side, and the refractive power may be either positive or negative.

The aperture stop is arranged between the second lens and the third lens, namely at a position near a center area of an optical system, and therefore symmetry is made across the aperture stop and distortion is reduced.

By having positive refractive power, the third lens achieves the low-profileness and corrects the spherical aberration.

By having negative refractive power, the fourth lens corrects astigmatism while correcting chromatic aberration. Furthermore, the fourth lens has at least one aspheric surface and an effect thereof can be improved.

The fifth lens excellently corrects astigmatism occurred according to the wide field of view. Furthermore, the fifth lens has at least one aspheric surface and the effect thereof can be improved.

It is preferable that the fifth lens has a meniscus shape having a concave surface facing the object side, and the refractive power may be either positive or negative.

The sixth lens ensures back focus while maintaining the low-profileness. The image-side surface is the concave surface facing the image side near the optical axis and is formed as the aspheric surface, which changes to the convex surface facing the image side at an area apart from the optical axis. Therefore, there are achieved field curvature correction, distortion correction and control of an angle of light ray incident to the image sensor.

According to the imaging lens having the above structure, it is preferable that the object-side surface of the first lens is plane or the concave surface facing the object side near the optical axis.

The object-side surface of the first lens is the plane or the concave surface facing the object side near the optical axis, and it enables a position of principal point to be moved toward the image side. Even if focal length of an overall optical system is shortened, required back focus is ensured.

According to the imaging lens having the above structure, it is preferable that the image-side surface of the first lens is plane or the convex surface facing the image side near the optical axis.

The image-side surface of the first lens is the plane or the convex surface facing the image side near the optical axis, and it enables a position of principal point to be moved toward the image side. Therefore, more appropriate back focus is ensured.

According to the imaging lens having the above structure, it is preferable that the object-side surface of the first lens is formed as the aspheric surface which changes to the convex surface at a peripheral area. The object-side surface of the first lens is the convex surface at the peripheral area, and it enables light ray incident to the peripheral area of the first lens to enter at an angle near a normal line of the lens surface. Thereby, occurrence of high-order aberration is prevented. The peripheral area of the object-side surface of the first lens is formed as the convex surface having a pole point, and therefore the first lens reduces an amount of Sag and contributes to the low-profileness. Furthermore, such shape of the first lens is symmetrical with respect to a shape of the image-side surface of the sixth lens of the last lens, and distortion is excellently corrected.

According to the imaging lens having the above structure, it is preferable that the image-side surface of the first lens is formed as the aspheric surface, which changes to the concave surface at the peripheral area thereof.

The image-side surface of the first lens is the concave surface at the peripheral area, and it enables light ray emitted from the peripheral area of the first lens to emit at an angle near a normal line of the lens surface. Thereby, occurrence of further high-order aberration is prevented. The peripheral area of the image-side surface of the first lens is formed as the concave surface having the pole point, and therefore the first lens reduces the amount of Sag and contributes to the low-profileness. Furthermore, such shape of the first lens is symmetrical with respect to a shape of the object-side surface of the sixth lens of the last lens, and distortion is excellently corrected.

According to the imaging lens having the above structure, it is preferable that the second lens is a meniscus lens having a concave surface facing the image side near the optical axis.

By using the meniscus lens having the concave surface facing the image side, the second lens makes it possible to correct spherical aberration even for a wide field of view, and makes it easy to correct coma aberration.

According to the imaging lens having the above structure, it is preferable that the third lens has biconvex shape having convex surfaces facing both surfaces near the optical axis.

By using the biconvex shape, the third lens achieves low-profileness by positive refractive power of the object-side surface and the image-side surface. The lens having main positive refractive power is arranged near the center area of the optical system, and therefore it becomes easy to balance the aberrations of the overall optical system. Furthermore, the third lens has the biconvex shape, and curvature is suppressed from being large and sensitivity to manufacturing error is reduced.

According to the imaging lens having the above structure, it is preferable that the fourth lens is a meniscus lens having a concave surface facing the object side near the optical axis.

By using the meniscus lens having the concave surface facing the object side near the optical axis, the fourth lens facilitates correction of the astigmatism while correcting the chromatic aberration.

According to the imaging lens having the above structure, it is preferable that the fifth lens is a meniscus lens having a concave surface facing the object side near the optical axis.

By using the meniscus lens having the concave surface facing the object side near the optical axis, the fifth lens effectively corrects the astigmatism which may be increased according to the wide field of view.

According to the imaging lens having the above structure, it is preferable that the object-side surface of the sixth lens is the convex surface facing the object side near the optical axis, and is formed as the aspheric surface which changes to the concave surface having the pole point at an area apart from the optical axis.

By using a shape that the object-side surface is the convex surface facing the object side near the optical axis, namely the meniscus shape near the optical axis, the sixth lens easily ensures the back focus. The peripheral area of the object-side surface of the sixth lens is formed as the concave surface having the pole point, and therefore the sixth lens controls an angle of the light ray incident to the image sensor. Furthermore, by gradually changing from the convex surface to the concave surface, the field curvature at middle image height is excellently suppressed.

According to the imaging lens having the above structure, it is preferable that a below conditional expression (1) is satisfied:

$$0.6 < t23/t34 < 1.6 \quad (1)$$

where $t23$: distance along the optical axis from the image-side surface of the second lens to the object-side surface of the third lens, and $t34$: distance along the optical axis from the image-side surface of the third lens to the object-side surface of the fourth lens.

The conditional expression (1) defines an appropriate relationship between a distance between the second lens and the third lens, and a distance between the third lens and the fourth lens. By satisfying the conditional expression (1), the low-profileness and the low F-number are achieved and the aberrations is excellently corrected.

Regarding the conditional expression (1), a below conditional expression (1a) is more preferable, and a conditional expression (1b) is especially preferable.

$$0.6 < t23/t34 < 1.2 \quad (1a)$$

$$0.65 \leq t23/t34 \leq 0.90 \quad (1b)$$

According to the imaging lens having the above structure, it is preferable that below conditional expressions (2) and (3) are satisfied:

$$-0.3 < (Nd1-1)/r1 \leq 0.0$$

$$0.0 \leq (1-Nd1)/r2 < 0.3 \quad (3)$$

where $Nd1$: refractive index at d-ray of the first lens, $r1$: curvature radius near the optical axis of the object-side surface of the first lens, and $r2$: curvature radius near the optical axis of the image-side surface of the first lens.

The conditional expression (2) defines an appropriate scope of the refractive power of the object-side surface near the optical axis of the first lens. The conditional expression (3) defines an appropriate scope of the refractive power of the image-side surface near the optical axis of the first lens. The scopes of the conditional expressions (2) and (3) is made so that the object-side surface and the image-side surface of the first lens have small refractive power, and thereby an effect of the correction of the spherical aberration by the aspheric surfaces of both sides is improved while maintaining the low-profileness and the wide field of view. The upper value "0.0" of the conditional expressions (2) and the lower value "0.0" of the conditional expressions (3) mean that a surface which does not substantively have the refractive power, namely a plane surface is also included.

Regarding the conditional expressions (2) and (3), below conditional expressions (2a) and (3a) are more preferable:

$$-0.2<(Nd1-1)/r1 \leq 0.0 \tag{2a}$$

$$0.0 \leq (1-Nd1)/r2 < 0.25 \tag{3a}$$

According to the imaging lens having the above structure, it is preferable that below conditional expressions (4) to (7) are satisfied:

$$3.0<|f2/f| \tag{4}$$

$$0.5<f3/f<1.5 \tag{5}$$

$$-2.5<f4/f<-0.8 \tag{6}$$

$$15<|f5/f| \tag{7}$$

where
f: focal length of the overall optical system of the imaging lens,
f2: focal length of the second lens,
f3: focal length of the third lens,
f4: focal length of the fourth lens, and
f5: focal length of the fifth lens.

The conditional expression (4) defines an appropriate scope of ratio of a focal length of the second lens to the focal length of the overall optical system of the imaging lens. By defining the scope of the conditional expression (4), coma aberration is corrected without excessively affecting a total track length and back focus.

Regarding the conditional expression (4), a below conditional expression (4a) is more preferable:

$$3.0<|f2/f|<40.0 \tag{4a}$$

The conditional expression (5) defines an appropriate scope of ratio of a focal length of the third lens to the focal length of the overall optical system of the imaging lens. When the value is above the lower limit of the conditional expression (5), occurrence of high-order aberration is prevented without making the positive refractive power of the third lens excessively large, and sensitivity to manufacturing error is reduced. On the other hand, when the value is below the upper limit of the conditional expression (5), it becomes easy to maintain the low-profileness and to correct the spherical aberration without making the positive refractive power of the third lens excessively small.

Regarding the conditional expression (5), a below conditional expression (5a) is more preferable:

$$0.6<f3/f<1.0 \tag{5a}$$

The conditional expression (6) defines an appropriate scope of ratio of a focal length of the fourth lens to the focal length of the overall optical system of the imaging lens. When the value is above the lower limit of the conditional expression (6), it becomes easy to correct the chromatic aberration and the astigmatism by negative refractive power of the fourth lens. On the other hand, when the value is below the upper limit of the conditional expression (6), the negative refractive power of the fourth lens is prevented from being excessively large and the spherical aberration is suppressed from being excessively corrected.

Regarding the conditional expression (6), a below conditional expression (6a) is more preferable:

$$-2.5<f4/f<-1.2 \tag{6a}$$

The conditional expression (7) defines an appropriate scope of ratio of a focal length of the fifth lens to the focal length of the overall optical system of the imaging lens. When the value is above the lower limit of the conditional expression (7), occurrence of chromatic aberration of magnification is prevented by having appropriate refractive power, and the astigmatism and the field curvature are corrected.

Regarding the conditional expression (7), a below conditional expression (7a) is more preferable:

$$15<|f5/f|<50 \tag{7a}$$

According to the imaging lens having the above structure, it is preferable that a below conditional expression (8) is satisfied:

$$1.0<f6/f<2.0 \tag{8}$$

where
f: focal length of the overall optical system of the imaging lens, and
f6: focal length of the sixth lens.

The conditional expression (8) defines an appropriate scope of ratio of a focal length of the sixth lens to the focal length of the overall optical system of the imaging lens. When the value is above the lower limit of the conditional expression (8), the positive refractive power of the sixth lens is prevented from being large, and the field curvature and the distortion are corrected. On the other hand, when the value is below the upper limit of the conditional expression (8), the positive refractive power of the sixth lens is prevented from being small and it becomes easy to achieve the low-profileness.

Regarding the conditional expression (8), a below conditional expression (8a) is more preferable:

$$1.5 \leq f6/f \leq 1.80 \tag{8a}$$

According to the imaging lens having the above structure, it is preferable that below conditional expressions (9) and (10) are satisfied:

$$18<vd2<28 \tag{9}$$

$$25<|vd3-vd4|<45 \tag{10}$$

where
vd2: abbe number at d-ray of the second lens,
vd3: abbe number at d-ray of the third lens, and
vd4: abbe number at d-ray of the fourth lens.

The conditional expressions (9) and (10) define abbe numbers at d-ray of the second lens, the third lens and the fourth lens, respectively. By satisfying the conditional expressions (9) and (10) using the abbe numbers of the second lens, the third lens and the fourth lens, the chromatic aberration is excellently corrected.

According to the imaging lens having the above structure, it is preferable that a below conditional expression (11) is satisfied:

$$0.6<TTL/2ih<1.0 \tag{11}$$

where
TTL: total track length, and
ih: maximum image height.

The conditional expression (11) is a condition for meeting demand of the low-profileness and the wide field of view required in recent years. By satisfying the conditional expression (11), it is possible to achieve the low-profileness of the overall lens system and to excellently correct the aberrations.

Regarding the conditional expression (11), a below conditional expression (11a) is more preferable condition:

$$0.6 < TTL/2ih \leq 0.8 \quad (11a)$$

According to the imaging lens having the above structure, it is preferable that a below conditional expression (12) is satisfied:

$$0.8 < (L1F-L3F)/(L3R-L5R) < 1.2 \quad (12)$$

where (L1F–L3F): distance along the optical axis from the object-side surface of the first lens to the object-side surface of the third lens, and (L3R–L5R): distance along the optical axis from the image-side surface of the third lens to the image-side surface of the fifth lens.

The conditional expression (12) defines an appropriate scope of relationship between the distance along the optical axis from the object-side surface of the first lens to the object-side surface of the third lens, and the distance along the optical axis from the image-side surface of the third lens to the image-side surface of the fifth lens. By satisfying the conditional expression (12), power balance of each lens is properly kept while maintaining the low-profileness, and it becomes easy to excellently correct the aberrations.

Regarding the conditional expression (12), a below conditional expression (12a) is more preferable:

$$0.9 \leq (L1F-L3F)/(L3R-L5R) \leq 1.1 \quad (12a)$$

According to the imaging lens having the above structure, it is preferable that a below conditional expression (13) is satisfied:

$$0.2 < EPD/TTL < 0.4 \quad (13)$$

where

EPD: entrance pupil diameter, and

TTL: total track length.

The conditional expression (13) defines an appropriate scope of a size of the entrance pupil diameter to the total track length. By satisfying the conditional expression (13), the imaging lens which has sufficient brightness required in the recent years is provided.

Regarding the conditional expression (13), a below conditional expression (13a) is more preferable:

$$0.25 \leq EPD/TTL \leq 0.35 \quad (13a)$$

Effect of Invention

According to the present invention, there can be provided an imaging lens with high resolution which satisfies in well balance low-profileness, wide field of view and low F-number.

DETAILED DESCRIPTION OF THE PREFERRED EMBODIMENT

Hereinafter, the preferred embodiment of the present invention will be described in detail referring to the accompanying drawings.

FIGS. 1, 3, 5, 7 and 9 are schematic views showing the general configurations of the imaging lenses in Examples 1 to 5 according to the embodiments of the present invention, respectively. Since all these examples have the same basic lens configuration, the general configuration of an imaging lens according to this embodiment is explained below mainly referring to the schematic view of Example 1.

Figure 1:
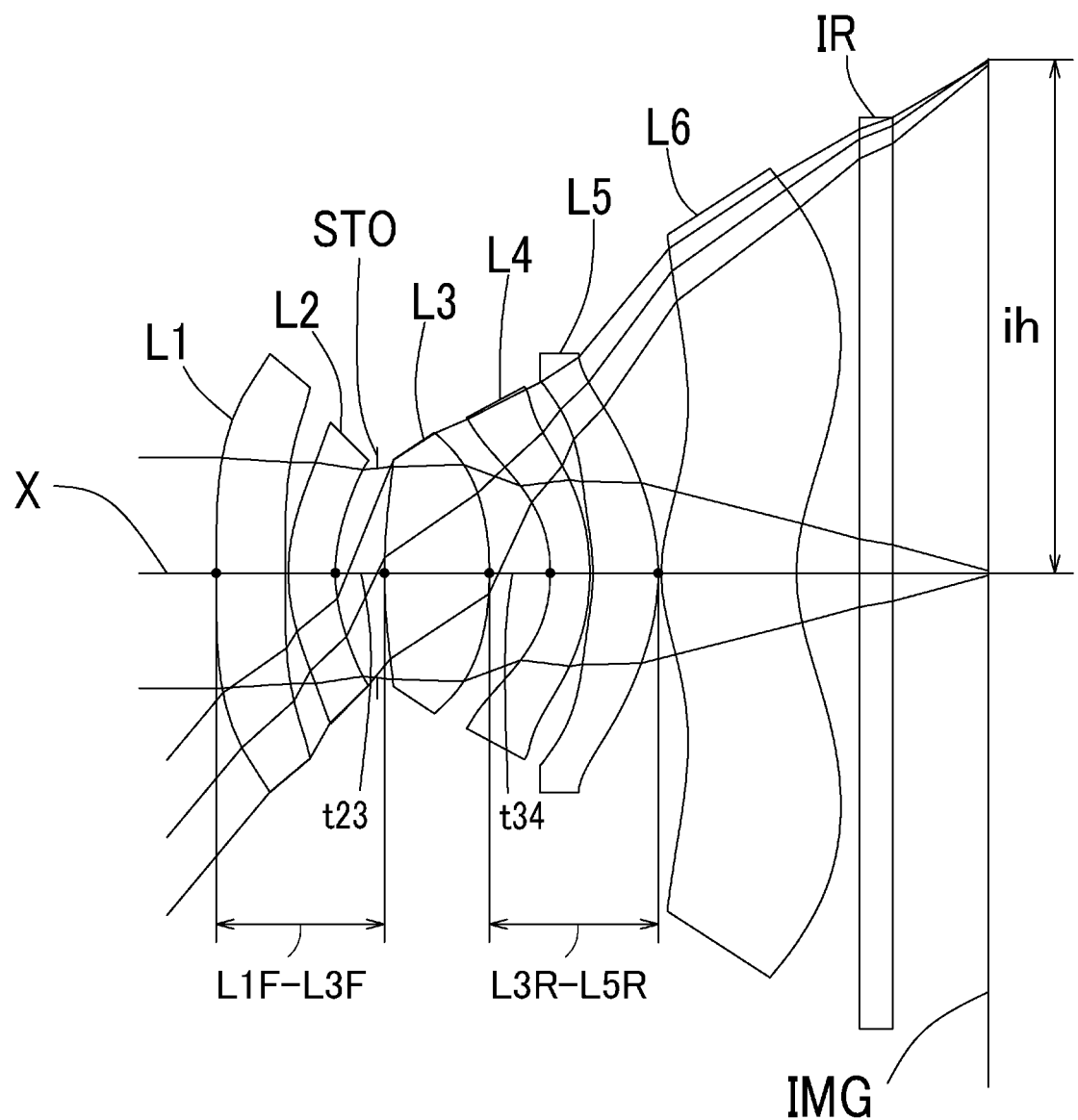
FIG. 1 is a schematic view showing a general configuration of an imaging lens in Example 1 according to the present invention.

As shown in FIG. 1, an imaging lens according to this embodiment comprises in order from an object side to an image side, a first lens L1 being double-sided aspheric lens, a second lens L2 having positive or negative refractive power, an aperture stop STO, a third lens L3 having the positive refractive power, a fourth lens L4 having at least one aspheric surface and the negative refractive power, a fifth lens L5 having at least one aspheric surface and the positive or negative refractive power, and a sixth lens L6 being the double-sided aspheric lens and having the positive refractive power, wherein an image-side surface of the sixth lens L6 is a concave surface facing the image side near an optical axis X and is formed as the aspheric surface, which changes to a convex surface at an area apart from the optical axis X.

A filter IR such as an IR cut filter and a cover glass is located between the sixth lens L6 and an image plane IMG (namely, the image plane of the imaging lens). The filter IR is omissible.

Figure 3:
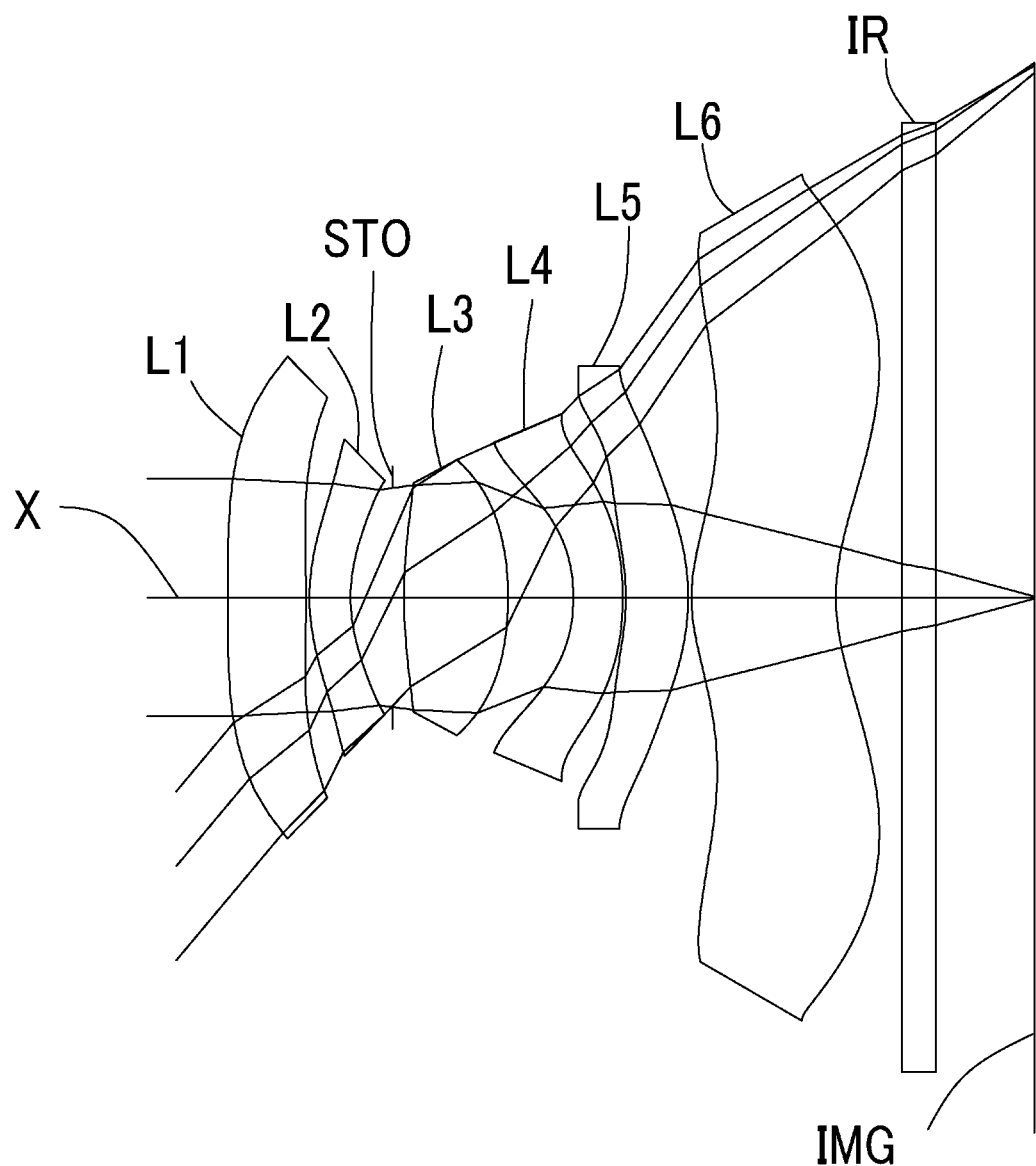
FIG. 3 is a schematic view showing the general configuration of an imaging lens in Example 2 according to the present invention.

By using the double-sided aspheric lens, the first lens L1 excellently corrects the aberration for light ray incident from wide field of view from a center to off-axis area. In FIG. 1, the first lens L1 has planes facing the object side and the image side near the optical axis X, and substantively has no refractive power near the optical axis X. A shape of the first lens L1, however, is not limited thereto. As shown in FIG. 3, the first lens L1 may have a shape of plane-convex shape of which the object-side surface is the plane and the image-side surface is convex near the optical axis X. Furthermore, as shown in FIGS. 5 to 9, the first lens L1 may have a meniscus shape of which the object-side surface is concave and the image-side surface is convex near the optical axis X.

As a shape of the first lens L1 near the optical axis, the first lens L1 has the object-side surface being the plane surface or the concave surface and the image-side surface being the plane surface or the convex surface, therefore a position of principal point is moved toward the image side. Therefore, if focal length of an overall optical system is shortened, coping with the wide field of view, required back focus is ensured.

Furthermore, the object-side surface of the first lens L1 is formed as the aspheric surface, which changes to the convex surface at the peripheral area, and the image-side surface is formed as the aspheric surface, which changes to the concave surface at the peripheral area. The convex surface at the peripheral area of the object-side surface has the pole point, and the concave surface of the peripheral area of the image-side surface also has the pole point.

Thus configured as the aspheric surfaces, the light ray incident to the peripheral area is entered at an angle near a normal line of the lens surface of the object side, and the light ray emitted from the peripheral area is emitted at an angle near a normal line of the lens surface of the image side. Thereby, occurrence of the high-order aberration is prevented. By having the pole point, an amount of Sag is reduced, and contribution to the low-profileness is made. Furthermore, such shape of the lens is symmetrical with respect to a shape of the sixth lens L6 of the last lens, and distortion is excellently corrected accordingly.

The second lens L2 is a meniscus lens having the concave surface facing the image side and has the positive refractive power, and excellently corrects the spherical aberration and the coma aberration occurred at the first lens L1. The refractive power of the second lens L2 may be, as shown in FIGS. 3 to 9, the negative refractive power when the first lens L1 has the positive refractive power. In this case, the chromatic aberration is excellently corrected.

The aperture stop STO is arranged between the second lens L2 and the third lens L3, namely at a position near a center area of an optical system. Therefore, symmetry is made across the aperture stop, and distortion increased according to the wide field of view is reduced.

The third lens L3 has biconvex shape having convex surfaces facing the object side and the image side, and has the positive refractive power. By having the biconvex shape, the third lens L3 achieves the low-profileness. The lens having main positive refractive power is arranged near the center area of the optical system, and therefore it becomes easy to balance the aberrations of the overall optical system. Furthermore, the third lens has the biconvex shape, and curvature is suppressed from being large and sensitivity to manufacturing error is reduced.

The fourth lens L4 is a meniscus lens having the concave surface facing the object side near the optical axis, and has the negative refractive power. At least one aspheric surface is provided, and the astigmatism is corrected while correcting the chromatic aberration.

Figure 9:
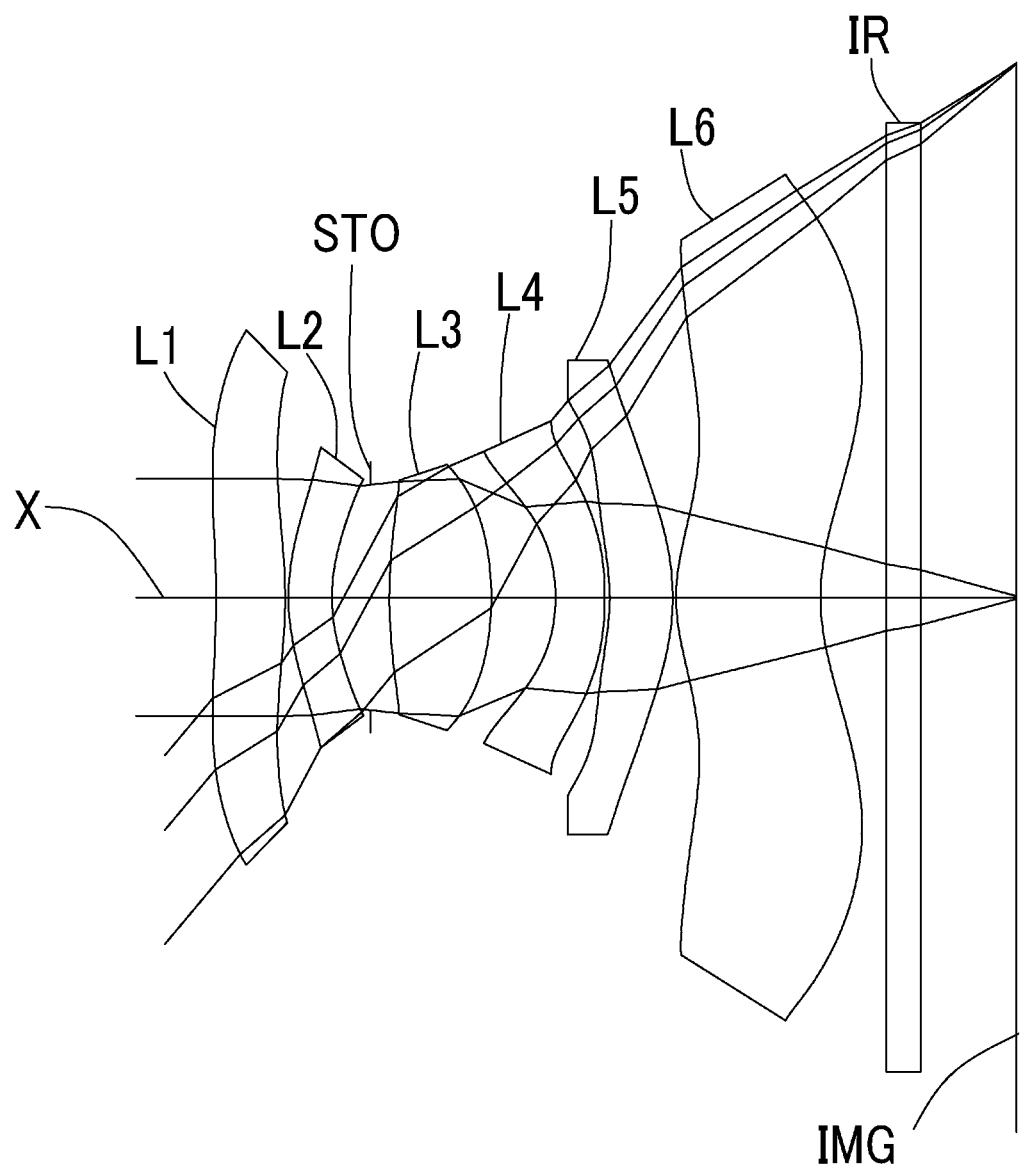
FIG. 9 is a schematic view showing the general configuration of an imaging lens in Example 5 according to the present invention.

The fifth lens L5 is a meniscus lens having the concave surface facing the object side near the optical axis, and has the negative refractive power. At least one aspheric surface is provided, and the astigmatism occurred according to the wide field of view is excellently corrected. The refractive power of the fifth lens L5 may be positive as shown in FIG. 9.

The sixth lens L6 is a meniscus lens having the concave surface facing the image side near the optical axis X. Also, the sixth lens L6 is the double-sided aspheric lens and has the positive refractive power, and ensures the back focus while maintaining the low-profileness. The aspheric surface is formed as the image-side surface is the concave surface facing the image side near the optical axis X, which changes to the convex surface facing the image side at an area apart from the optical axis X. Therefore, there are achieved the field curvature correction, distortion correction and control of an angle of light ray incident to the image sensor. The aspheric surface is also formed as the object-side surface of the sixth lens L6 is the convex surface facing the object side near the optical axis X, which changes to the concave surface facing the object side at an area apart from the optical axis X. The sixth lens L6 controls an angle of the light ray incident to the image sensor as well as the image-side surface. Furthermore, by gradually changing from the convex surface to the concave surface, the field curvature at middle image height is excellently suppressed.

The imaging lens according to the present embodiments shows preferable effect by satisfying the below conditional expressions (1) to (13).

$$0.6 < t23/t34 < 1.6 \quad (1)$$

$$-0.3 < (Nd1-1)/r1 < 0.0 \quad (2)$$

$$0.0 \leq (1-Nd1)/r2 < 0.3 \quad (3)$$

$$3.0 < |f2/f| \quad (4)$$

$$0.5 < f3/f < 1.5 \quad (5)$$

$$-2.5 < f4/f < -0.8 \quad (6)$$

$$|5 < |f5/f| \quad (7)$$

$$1.0 < f6/f < 2.0 \quad (8)$$

$$18 < vd2 < 28 \quad (9)$$

$$25 < |vd3 - vd4| < 45 \quad (10)$$

$$0.6 < TTL/2ih < 1.0 \quad (11)$$

$$0.8 < (L1F - L3F)/(L3R - L5R) < 1.2 \quad (12)$$

$$0.2 < EPD/TTL < 0.4 \quad (13)$$

where
t23: distance along the optical axis between the second lens L2 and the third lens L3,
t34: distance along the optical axis between the third lens L3 and the fourth lens L4,
Nd1: refractive index at d-ray of the first lens L1,
r1: curvature radius near the optical axis of the object-side surface of the first lens L1,
r2: curvature radius near the optical axis of the image-side surface of the first lens L1,
f: focal length of the overall optical system of the imaging lens,
f2: focal length of the second lens L2,
f3: focal length of the third lens L3,
f4: focal length of the fourth lens L4,
f5: focal length of the fifth lens L5,
f6: focal length of the sixth lens L6,
vd2: abbe number at d-ray of the second lens L2,
vd3: abbe number at d-ray of the third lens L3,
vd4: abbe number at d-ray of the fourth lens L4,
TTL: total track length,
ih: maximum image height,
(L1F-L3F): distance along the optical axis from the object-side surface of the first lens L1 to the object-side surface of the third lens L3,
(L3R-L5R): distance along the optical axis from the image-side surface of the third lens L3 to the image-side surface of the fifth lens L5, and
EPD: entrance pupil diameter.

Regarding the imaging lens according to the present embodiments, it is preferable to satisfy all of conditional expressions. By satisfying the conditional expression individually, operational advantage corresponding to each conditional expression can be obtained.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, w denotes a half field of view, ih denotes a maximum image height (length of diagonal line of the effective image plane of the image sensor) a, TTL denotes the total track length, and EPD denotes an entrance pupil diameter. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

Example 1

| Unit mm |
|---|
| f = 2.71 |
| Fno = 1.82 |
| ω(°) = 50.0 |
| ih = 3.26 |
| TTL = 4.82 |
| EPD = 1.48 |

Surface Data

| Surface Number i | Curvature Radius r | Surface Distance d | Refractive Index Nd | Abbe Number vd |
|---|---|---|---|---|
| (Object) | Infinity | Infinity | | |
| 1* | Infinity | 0.4368 | 1.5443 | 55.865 (=vd1) |
| 2* | Infinity | 0.0200 | | |
| 3* | 1.1789 | 0.2986 | 1.6607 | 20.365 (=vd2) |
| 4* | 1.0798 | 0.2649 | | |
| 5(Stop) | Infinity | 0.0465 | | |
| 6* | 3.6614 | 0.6661 | 1.5348 | 55.664 (=vd3) |
| 7* | −2.0997 | 0.3862 | | |
| 8* | −1.0976 | 0.2500 | 1.6607 | 20.365 (=vd4) |
| 9* | −1.7223 | 0.0207 | | |
| 10* | −1.2441 | 0.4136 | 1.5443 | 55.865 (=vd5) |
| 11* | −1.4549 | 0.0200 | | |
| 12* | 1.0336 | 0.8570 | 1.5348 | 55.664 (=vd6) |
| 13* | 1.2701 | 0.4000 | | |
| 14 | Infinity | 0.2100 | 1.5168 | 64.198 |
| 15 | Infinity | 0.6290 | | |
| Image Plane | Infinity | | | |

Constituent Lens Data

| Lens | Start Surface | Focal Length |
|---|---|---|
| 1 | 1 | Infinity |
| 2 | 3 | 97.573 |
| 3 | 6 | 2.600 |
| 4 | 8 | −5.447 |
| 5 | 10 | −51.108 |
| 6 | 12 | 4.588 |

Aspheric Surface Data

| | First Surface | Second Surface | Third Surface | Fourth Surface | Sixth Surface | Seventh Surface |
|---|---|---|---|---|---|---|
| k | −1.000000E+00 | −1.000000E+00 | 0.000000E+00 | 0.000000E+00 | 0.000000E+00 | 1.403170E+00 |
| A4 | 1.797726E−01 | 1.723351E−01 | −2.681040E−01 | −3.850807E−01 | −2.036931E−02 | −1.627902E−01 |
| A6 | −1.492221E−01 | −3.832891E−02 | 2.909194E−01 | 1.180462E+00 | 5.557822E−02 | 3.293751E−02 |
| A8 | 1.417201E−01 | −1.435741E−01 | −9.814161E−01 | −6.690402E+00 | −1.003922E+00 | −1.294590E−01 |
| A10 | −7.913961E−02 | 2.607346E−01 | 1.506531E+00 | 2.407548E+01 | 4.352207E+00 | −7.001897E−01 |
| A12 | 1.599723E−02 | −1.942422E−01 | −1.505163E+00 | −5.106573E+01 | −1.063761E+01 | 2.325505E+00 |
| A14 | 5.999273E−03 | 5.797865E−02 | 9.761256E−01 | 5.722652E+01 | 1.291587E+01 | −2.743487E+00 |

-continued

Unit mm
f = 2.71
Fno = 1.82
ω(°) = 50.0
ih = 3.26
TTL = 4.82
EPD = 1.48

| | | | | | |
|---|---|---|---|---|---|
| A16 | −2.750486E−03 | −4.807202E−03 | −2.854355E−01 | −2.384692E+01 | −5.838213E+00 | 1.203458E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | −1.302504E+01 | 0.000000E+00 | 0.000000E+00 | −7.061867E+00 | −7.737889E−01 |
| A4 | −1.075862E+00 | −8.592702E−01 | 1.314801E+00 | 9.599146E−02 | −1.316273E−01 | −2.690929E−01 |
| A6 | 4.177164E+00 | 2.769483E+00 | −3.027174E+00 | −6.713019E−02 | 6.960129E−03 | 1.201489E−01 |
| A8 | −1.128232E+01 | −6.805663E+00 | 4.844819E+00 | 2.417825E−01 | 4.145650E−02 | −4.605633E−02 |
| A10 | 2.112385E+01 | 1.025397E+01 | −5.460944E+00 | −4.299786E−01 | −2.578706E−02 | 1.218458E−02 |
| A12 | −2.313308E+01 | −8.726281E+00 | 4.083692E+00 | 3.698411E−01 | 7.259932E−03 | −2.084441E−03 |
| A14 | 1.371548E+01 | 3.933660E+00 | −1.776140E+00 | −1.488675E−01 | −1.012093E−03 | 2.024134E−04 |
| A16 | −3.419862E+00 | −7.362971E−01 | 3.400999E−01 | 2.357099E−02 | 5.640213E−05 | −8.444662E−06 |

The imaging lens in Example 1 satisfies conditional expressions (1) to (13) as shown in Table 6.

Figure 2:
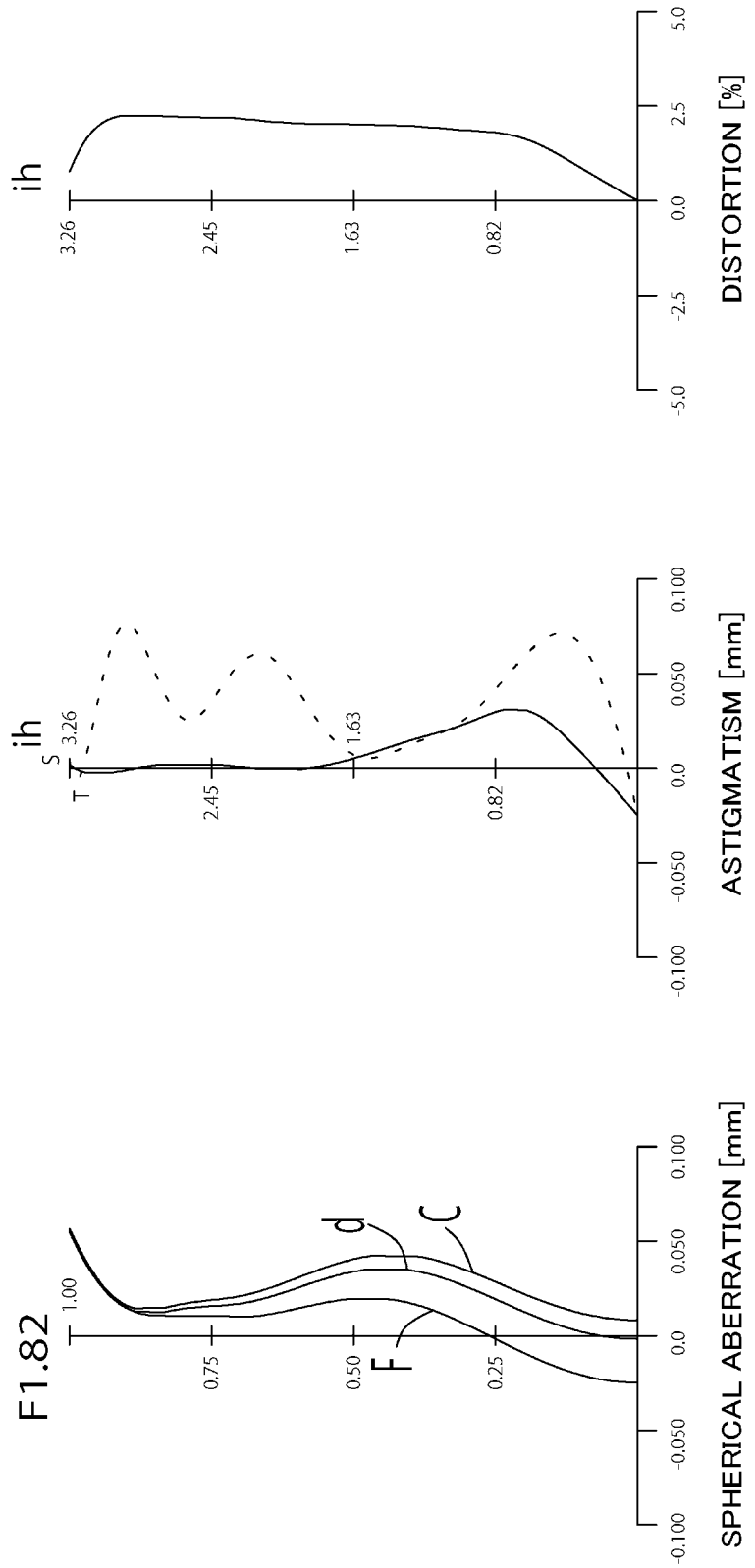
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S and on tangential image surface T, respectively (same as FIG. 4, FIG. 6, FIG. 8 and FIG. 10). As shown in FIG. 2, each aberration is corrected excellently.

Example 2

The basic lens data is shown below in Table 2.

Example 2

Unit mm
f = 2.69
Fno = 1.82
ω(°) = 50.0
ih = 3.26
TTL = 4.83
EPD = 1.48

Surface Data

| Surface Number i | Curvature Radius r | Surface Distance d | Refractive Index Nd | Abbe Number vd |
|---|---|---|---|---|
| (Object) | Infinity | Infinity | | |
| 1* | Infinity | 0.4766 | 1.6142 | 25.577 (=vd1) |
| 2* | −5.9956 | 0.0200 | | |
| 3* | 1.3052 | 0.2500 | 1.6607 | 20.365 (=vd2) |
| 4* | 0.9812 | 0.2541 | | |
| 5(Stop) | Infinity | 0.0723 | | |
| 6* | 3.4491 | 0.6337 | 1.5348 | 55.664 (=vd3) |
| 7* | −1.8585 | 0.3975 | | |
| 8* | −1.0736 | 0.3000 | 1.6607 | 20.365 (=vd4) |
| 9* | −2.0263 | 0.0202 | | |
| 10* | −1.2985 | 0.3791 | 1.5443 | 55.865 (=vd5) |
| 11* | −1.4836 | 0.0200 | | |
| 12* | 1.0082 | 0.8803 | 1.5348 | 55.664 (=vd6) |
| 13* | 1.2991 | 0.4000 | | |
| 14 | Infinity | 0.2100 | 1.5168 | 64.198 |
| 15 | Infinity | 0.6087 | | |
| Image Plane | Infinity | | | |

Constituent Lens Data

| Lens | Start Surface | Focal Length |
|---|---|---|
| 1 | 1 | 9.761 |
| 2 | 3 | −8.631 |
| 3 | 6 | 2.356 |
| 4 | 8 | −3.951 |
| 5 | 10 | −68.834 |
| 6 | 12 | 4.098 |

Unit mm
f = 2.69
Fno = 1.82
ω(°) = 50.0
ih = 3.26
TTL = 4.83
EPD = 1.48

Aspheric Surface Data

|  | First Surface | Second Surface | Third Surface | Fourth Surface | Sixth Surface | Seventh Surface |
|---|---|---|---|---|---|---|
| k   | −1.000000E+00 | −1.000000E+00 | 0.000000E+00  | 0.000000E+00  | 0.000000E+00  | 6.586469E−01  |
| A4  | 1.432259E−01  | 3.347359E−01  | −2.462888E−01 | −6.479659E−01 | −1.322072E−02 | −1.806816E−01 |
| A6  | −1.211465E−01 | −5.383549E−01 | 2.477404E−01  | 1.831641E+00  | −1.468350E−01 | 2.835688E−01  |
| A8  | 1.379664E−01  | 8.140234E−01  | −1.483750E+00 | −8.919506E+00 | 9.895538E−01  | −1.671818E+00 |
| A10 | −1.146546E−01 | −8.981354E−01 | 3.557731E+00  | 2.855813E+01  | −5.773549E+00 | 4.521650E+00  |
| A12 | 6.153994E−02  | 6.590858E−01  | −4.626762E+00 | −5.386613E+01 | 1.571873E+01  | −7.306848E+00 |
| A14 | −1.798073E−02 | −2.856580E−01 | 3.253411E+00  | 5.308414E+01  | −2.166088E+01 | 6.116149E+00  |
| A16 | 2.102694E−03  | 5.431178E−02  | −9.439993E−01 | −1.834716E+01 | 1.232131E+01  | −1.941399E+00 |

|  | Eighth Surface | Ninth Surface | Tenth Surface | Eleventh Surface | Twelfth Surface | Thirteenth Surface |
|---|---|---|---|---|---|---|
| k   | 0.000000E+00  | −1.299367E+01 | 0.000000E+00  | 0.000000E+00  | −8.268465E+00 | −7.602346E−01 |
| A4  | −8.379216E−01 | −9.042880E−01 | 9.533473E−01  | −1.865154E−02 | −1.692933E−01 | −2.719961E−01 |
| A6  | 2.659732E+00  | 2.958174E+00  | −1.479618E+00 | 2.458213E−01  | 9.944472E−02  | 1.247516E−01  |
| A8  | −5.943567E+00 | −6.929414E+00 | 1.663691E+00  | 1.979642E−01  | −4.301596E−02 | −4.762595E−02 |
| A10 | 9.826717E+00  | 9.493128E+00  | −1.514714E+00 | −7.831807E−01 | 1.368863E−02  | 1.199900E−02  |
| A12 | −8.956667E+00 | −7.319193E+00 | 9.620160E−01  | 7.078698E−01  | −2.794975E−03 | −1.907234E−03 |
| A14 | 4.308540E+00  | 3.061849E+00  | −3.480073E−01 | −2.717305E−01 | 3.179394E−04  | 1.722042E−04  |
| A16 | −8.792719E−01 | −5.492515E−01 | 5.842055E−02  | 3.943808E−02  | −1.511600E−05 | −6.801414E−06 |

The imaging lens in Example 2 satisfies conditional expressions (1) to (13) as shown in Table 6.

Figure 4:
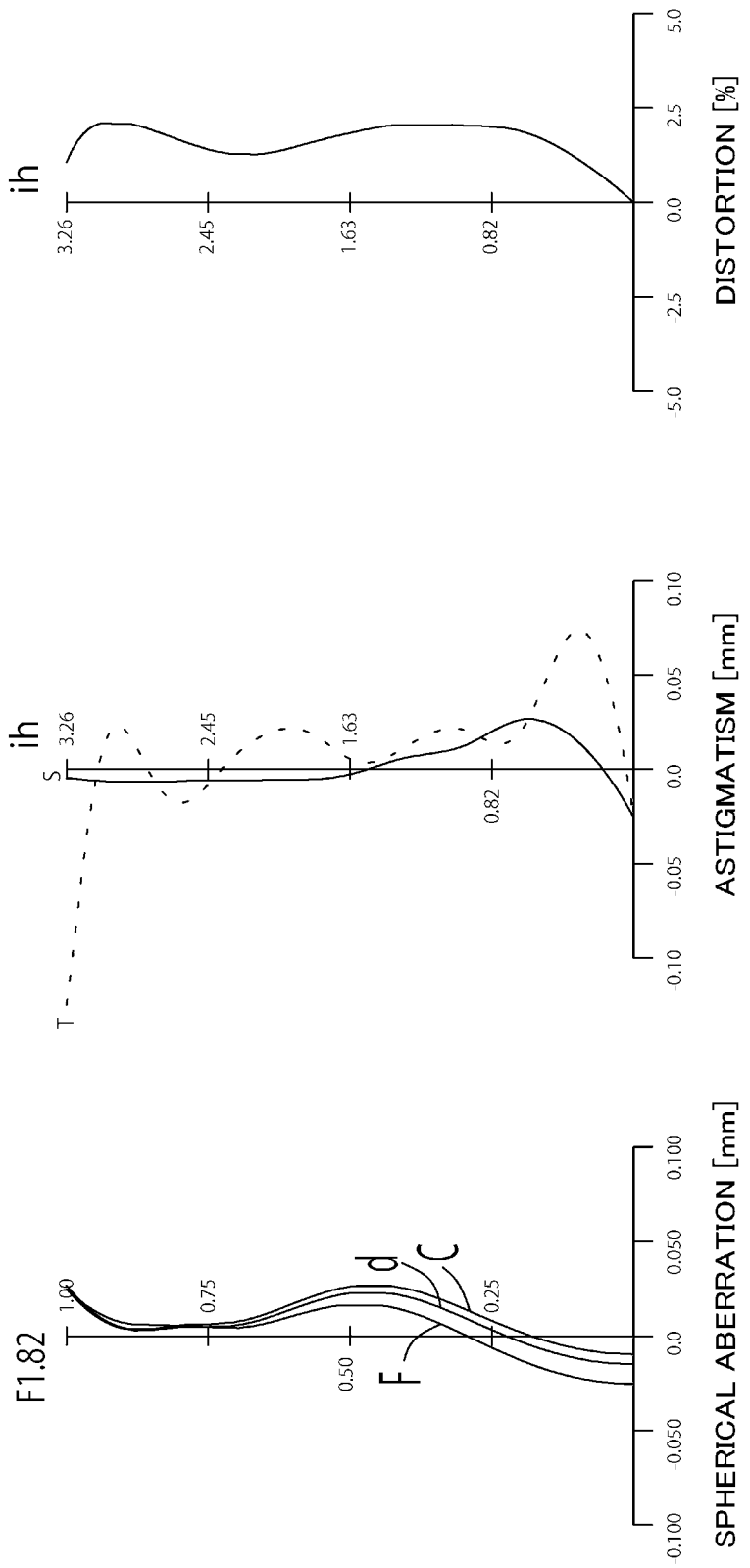
FIG. 4 shows spherical aberration, astigmatism, and distortion of the imaging lens in Example 2 according to the present invention.
Figure 5:
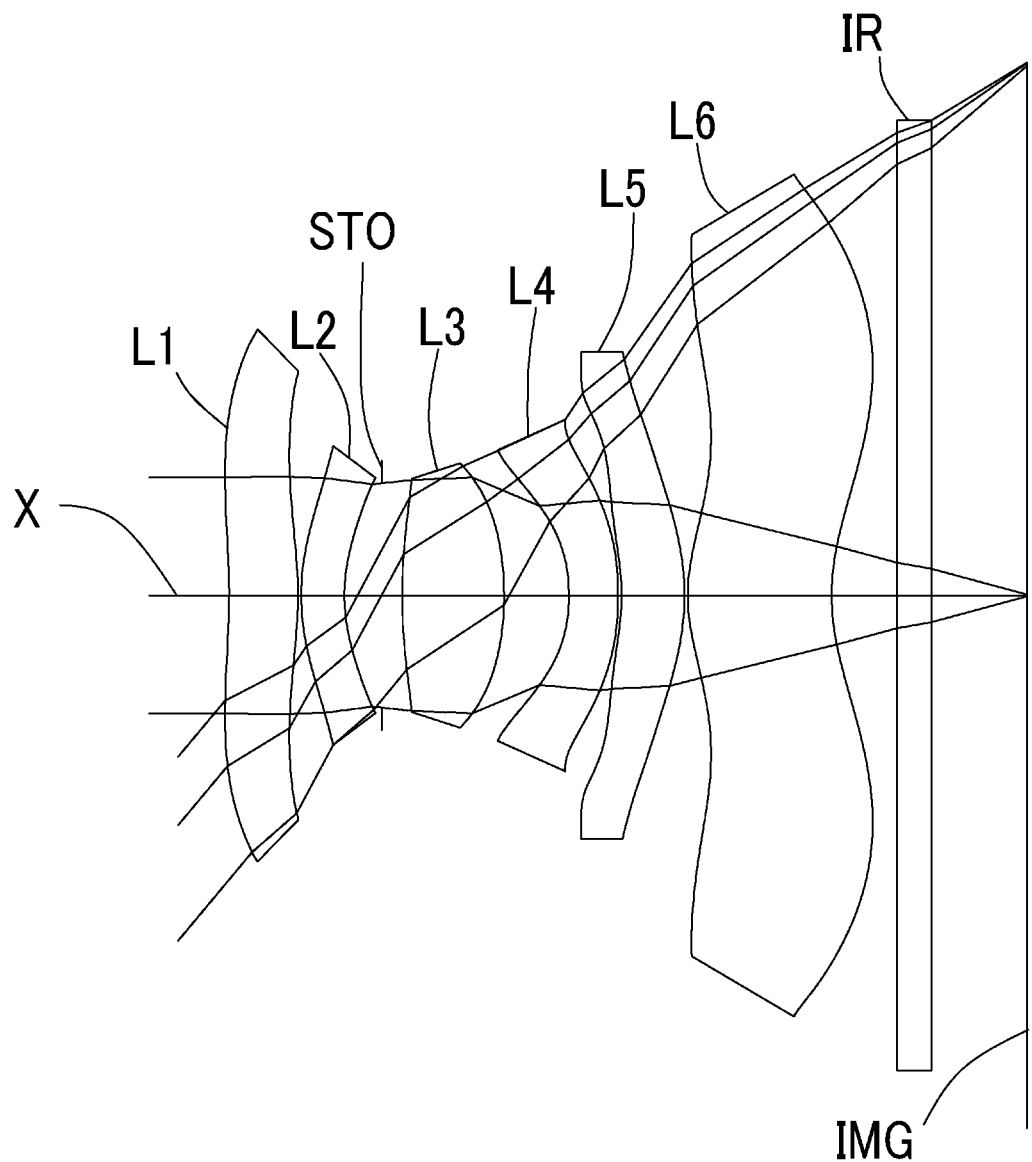
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

Example 3

Unit mm
f = 2.69
Fno = 1.82
ω(°) = 49.9
ih = 3.26
TTL = 4.80
EPD = 1.48

Surface Data

| Surface Number i | Curvature Radius r | Surface Distance d | Refractive Index Nd | Abbe Number vd |
|---|---|---|---|---|
| (Object) | Infinity |  |  |  |
| 1* | −4.5289 | 0.4208 | 1.6142 | 25.577 (=vd1) |
| 2* | −2.5820 | 0.0200 |  |  |
| 3* | 1.3537 | 0.2648 | 1.6607 | 20.365 (=vd2) |
| 4* | 1.0300 | 0.2277 |  |  |
| 5(Stop) | Infinity | 0.1261 |  |  |
| 6* | 3.4084 | 0.6237 | 1.5348 | 55.664 (=vd3) |
| 7* | −1.8963 | 0.3969 |  |  |
| 8* | −1.1080 | 0.3000 | 1.6607 | 20.365 (=vd4) |
| 9* | −2.2929 | 0.0215 |  |  |
| 10* | −1.3959 | 0.3849 | 1.5163 | 58.421 (=vd5) |
| 11* | −1.5929 | 0.0200 |  |  |
| 12* | 1.0301 | 0.8811 | 1.5348 | 55.664 (=vd6) |
| 13* | 1.3471 | 0.4000 |  |  |
| 14 | Infinity | 0.2100 | 1.5168 | 64.198 |

-continued

|  |  |
|---|---|
| Unit mm | |
| f = 2.69 | |
| Fno = 1.82 | |
| ω(°) = 49.9 | |
| ih = 3.26 | |
| TTL = 4.80 | |
| EPD = 1.48 | |

| | | |
|---|---|---|
| 15 | Infinity | 0.5958 |
| Image Plane | Infinity | |

Constituent Lens Data

| Lens | Start Surface | Focal Length |
|---|---|---|
| 1 | 1 | 9.036 |
| 2 | 3 | −9.667 |
| 3 | 6 | 2.376 |
| 4 | 8 | −3.608 |
| 5 | 10 | −66.617 |
| 6 | 12 | 4.158 |

Aspheric Surface Data

| | First Surface | Second Surface | Third Surface | Fourth Surface | Sixth Surface | Seventh Surface |
|---|---|---|---|---|---|---|
| k | −1.000000E+00 | −1.000000E+00 | 0.000000E+00 | 0.000000E+00 | 0.000000E+00 | 3.056868E−01 |
| A4 | 1.767867E−01 | 3.357545E−01 | −2.999942E−01 | −7.335992E−01 | −1.556505E−02 | −1.776825E−01 |
| A6 | −1.736935E−01 | −4.913865E−01 | 5.099147E−01 | 2.436469E+00 | −1.207468E−01 | 1.662706E−01 |
| A8 | 1.718513E−01 | 6.464306E−01 | −1.920762E+00 | −1.148353E+01 | 4.999901E−01 | −5.626883E−01 |
| A10 | −1.194623E−01 | −5.929907E−01 | 4.271614E+00 | 3.809621E+01 | −2.189721E+00 | 1.492138E−01 |
| A12 | 5.259858E−02 | 3.435122E−01 | −5.635129E+00 | −7.802054E+01 | 4.485661E+00 | 1.748822E+00 |
| A14 | −1.300566E−02 | −1.122969E−01 | 4.053875E+00 | 8.737067E+01 | −5.492830E+00 | −3.304127E+00 |
| A16 | 1.362416E−03 | 1.571463E−02 | −1.201422E+00 | −3.961802E+01 | 3.251532E+00 | 1.898396E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | −1.343320E+01 | 0.000000E+00 | 0.000000E+00 | −8.766421E+00 | −7.479152E−01 |
| A4 | −8.554883E−01 | −9.957579E−01 | 8.069601E−01 | 3.879057E−02 | −1.380973E−01 | −2.516710E−01 |
| A6 | 2.507261E+00 | 3.378474E+00 | −7.965785E−01 | 2.187401E−01 | 2.347262E−02 | 1.057362E−01 |
| A8 | −4.475403E+00 | −7.654879E+00 | −1.115848E−02 | −9.400703E−02 | 1.550108E−02 | −3.838012E−02 |
| A10 | 5.896195E+00 | 1.050514E+01 | 8.641389E−01 | −1.916973E−01 | −8.545558E−03 | 9.397965E−03 |
| A12 | −4.142820E+00 | −8.404342E+00 | −9.533548E−01 | 2.296693E−01 | 1.871797E−03 | −1.456235E−03 |
| A14 | 1.415485E+00 | 3.704254E+00 | 4.575786E−01 | −9.245063E−02 | −2.058015E−04 | 1.278177E−04 |
| A16 | −1.821261E−01 | −6.958314E−01 | −8.181535E−02 | 1.315855E−02 | 9.506637E−06 | −4.914545E−06 |

The imaging lens in Example 3 satisfies conditional expressions (1) to (13) as shown in Table 6.

Figure 6:
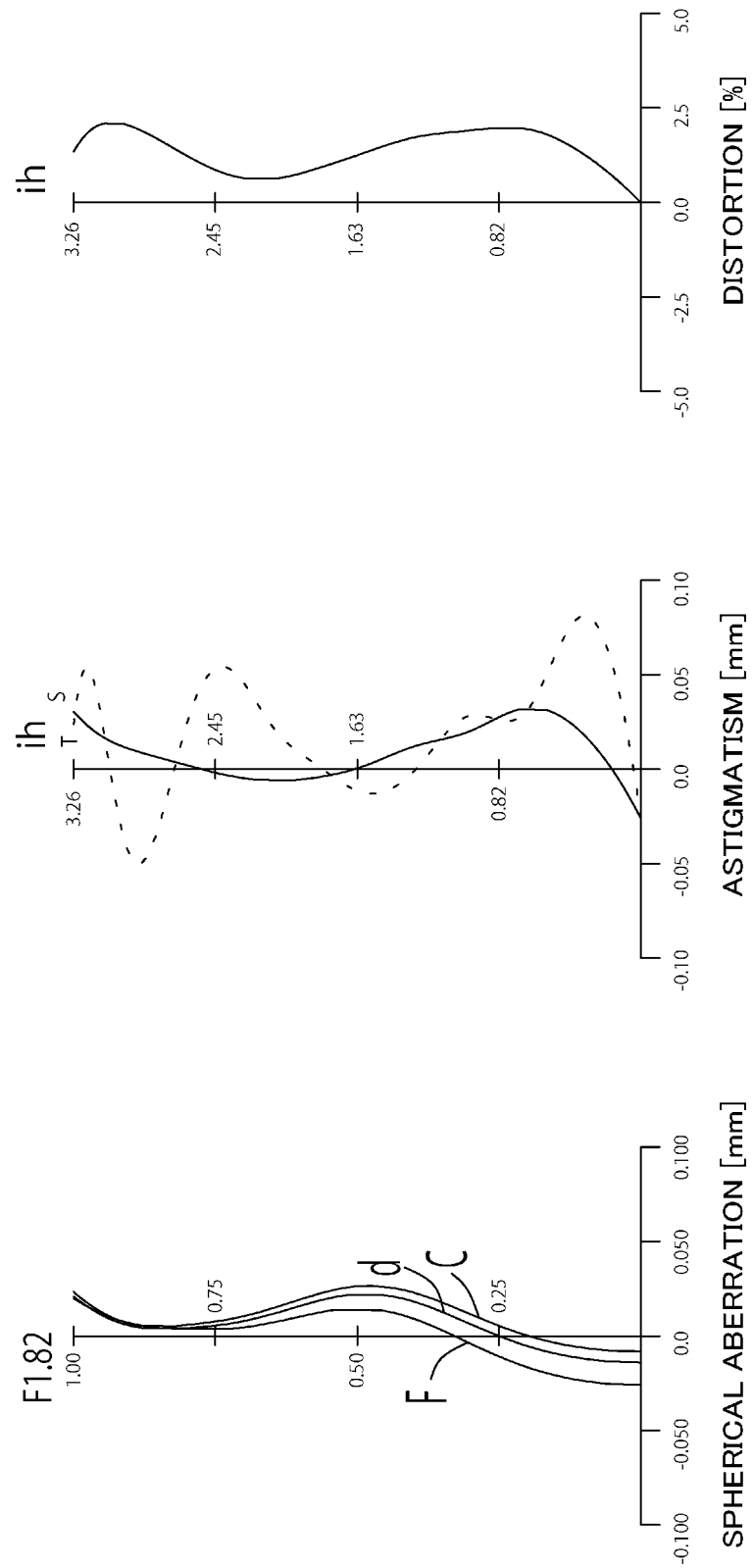
FIG. 6 shows spherical aberration, astigmatism, and distortion of the imaging lens in Example 3 according to the present invention.
Figure 7:
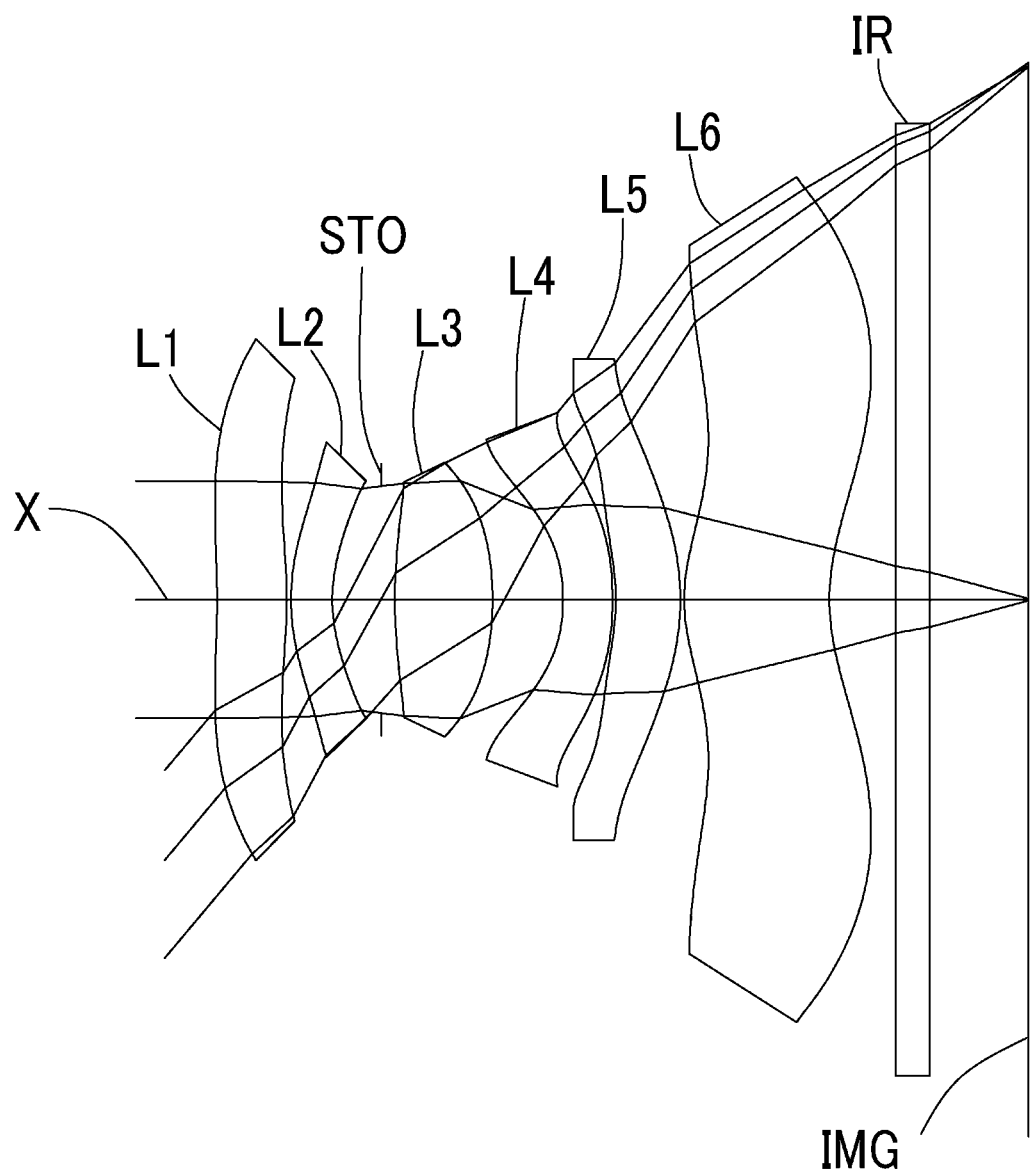
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

Example 4

|  |  |
|---|---|
| Unit mm | |
| f = 2.69 | |
| Fno = 1.82 | |
| ω(°) = 50.0 | |
| ih = 3.26 | |
| TTL = 4.82 | |
| EPD = 1.48 | |

Surface Data

| Surface Number i | Curvature Radius r | Surface Distance d | Refractive Index Nd | Abbe Number vd |
|---|---|---|---|---|
| (Object) | Infinity | Infinity | | |
| 1* | −5.9650 | 0.4225 | 1.6142 | 25.577 (=vd1) |
| 2* | −3.0960 | 0.0263 | | |

-continued

Unit mm
f = 2.69
Fno = 1.82
ω(°) = 50.0
ih = 3.26
TTL = 4.82
EPD = 1.48

| | | | | |
|---|---|---|---|---|
| 3* | 1.2807 | 0.2504 | 1.6607 | 20.365 (=vd2) |
| 4* | 0.9856 | 0.2942 | | |
| 5(Stop) | Infinity | 0.0862 | | |
| 6* | 3.5403 | 0.5922 | 1.5348 | 55.664 (=vd3) |
| 7* | −1.8240 | 0.4269 | | |
| 8* | −1.0952 | 0.3000 | 1.6607 | 20.365 (=vd4) |
| 9* | −2.1841 | 0.0200 | | |
| 10* | −1.3182 | 0.3915 | 1.5443 | 55.865 (=vd5) |
| 11* | −1.5055 | 0.0224 | | |
| 12* | 1.0389 | 0.8814 | 1.5348 | 55.664 (=vd6) |
| 13* | 1.3408 | 0.4000 | | |
| 14 | Infinity | 0.2100 | 1.5168 | 64.198 |
| 15 | Infinity | 0.5978 | | |
| Image Plane | Infinity | | | |

Constituent Lens Data

| Lens | Start Surface | Focal Length |
|---|---|---|
| 1 | 1 | 9.924 |
| 2 | 3 | −9.769 |
| 3 | 6 | 2.341 |
| 4 | 8 | −3.734 |
| 5 | 10 | −73.884 |
| 6 | 12 | 4.277 |

Aspheric Surface Data

| | First Surface | Second Surface | Third Surface | Fourth Surface | Sixth Surface | Seventh Surface |
|---|---|---|---|---|---|---|
| k | −1.000000E+00 | −1.000000E+00 | 0.000000E+00 | 0.000000E+00 | 0.000000E+00 | −5.944902E−02 |
| A4 | 1.852440E−01 | 3.423947E−01 | −3.179384E−01 | −7.227058E−01 | −5.012847E−02 | −1.896248E−01 |
| A6 | −1.784482E−01 | −4.913421E−01 | 4.287281E−01 | 1.728394E+00 | 2.220611E−01 | 3.142495E−01 |
| A8 | 1.774085E−01 | 6.246944E−01 | −1.616703E+00 | −5.349135E+00 | −2.019633E+00 | −1.766685E+00 |
| A10 | −1.267891E−01 | −5.567401E−01 | 3.401428E+00 | 8.518733E+00 | 8.130063E+00 | 4.723847E+00 |
| A12 | 5.883063E−02 | 3.172701E−01 | −4.150488E+00 | 9.255481E−01 | −1.926560E+01 | −6.962445E+00 |
| A14 | −1.558447E−02 | −1.045475E−01 | 2.769554E+00 | −2.157433E+01 | 2.378882E+01 | 4.799010E+00 |
| A16 | 1.753806E−03 | 1.513234E−02 | −7.618726E−01 | 2.146379E+01 | −1.134959E+01 | −8.976469E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | −1.632953E+01 | 0.000000E+00 | 0.000000E+00 | −7.613163E+00 | −7.493603E−01 |
| A4 | −8.930119E−01 | −9.982248E−01 | 9.002032E−01 | 8.626765E−02 | −1.600928E−01 | −2.550694E−01 |
| A6 | 2.821893E+00 | 3.253353E+00 | −1.200990E+00 | 3.008498E−02 | 3.916397E−02 | 1.080642E−01 |
| A8 | −5.625502E+00 | −7.292680E+00 | 7.985914E−01 | 1.388258E−01 | 1.297319E−02 | −3.886867E−02 |
| A10 | 9.014237E+00 | 1.014357E+01 | −7.948128E−02 | −3.549299E−01 | −9.938250E−03 | 9.427490E−03 |
| A12 | −9.048748E+00 | −8.281737E+00 | −2.554687E−01 | 3.228468E−01 | 2.568573E−03 | −1.457173E−03 |
| A14 | 5.258190E+00 | 3.703395E+00 | 1.645142E−01 | −1.287802E−01 | −3.242902E−04 | 1 285878E−04 |
| A16 | −1.352898E+00 | −6.998598E−01 | −2.860199E−02 | 1.940597E−02 | 1.682926E−05 | −5.003287E−06 |

The imaging lens in Example 4 satisfies conditional expressions (1) to (13) as shown in Table 6.

Figure 8:
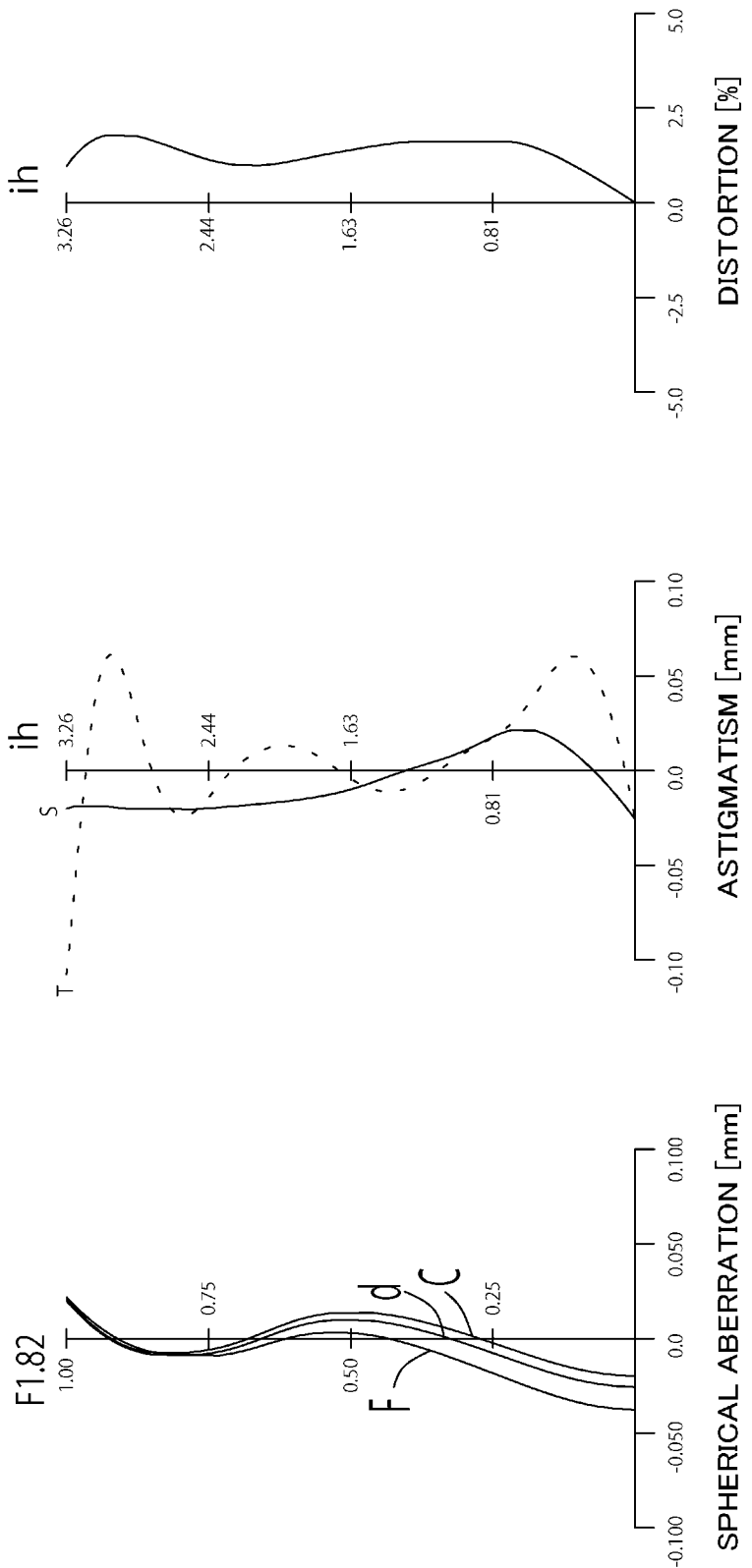
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

Example 5

Unit mm
f = 2.68
Fno = 1.82
ω(°) = 49.9
ih = 3.26
TTL = 4.79
EPD = 1.48

Surface Data

| Surface Number i | Curvature Radius r | Surface Distance d | Refractive Index Nd | Abbe Number vd |
|---|---|---|---|---|
| (Object) | Infinity | Infinity | | |
| 1* | −4.6783 | 0.4204 | 1.6142 | 25.577 (=vd1) |
| 2* | −2.6427 | 0.0200 | | |
| 3* | 1.3527 | 0.2641 | 1.6607 | 20.365 (=vd2) |
| 4* | 1.0274 | 0.2358 | | |
| 5(Stop) | Infinity | 0.1152 | | |
| 6* | 3.3397 | 0.6200 | 1.5348 | 55.664 (=vd3) |
| 7* | −1.9050 | 0.3908 | | |
| 8* | −1.1077 | 0.3000 | 1.6607 | 20.365 (=vd4) |
| 9* | −2.2738 | 0.0300 | | |
| 10* | −1.3961 | 0.3849 | 1.5443 | 55.865 (=vd5) |
| 11* | −1.5019 | 0.0200 | | |
| 12* | 1.0706 | 0.8800 | 1.5348 | 55.664 (=vd6) |
| 13* | 1.3446 | 0.4000 | | |
| 14 | Infinity | 0.2100 | 1.5168 | 64.198 |
| 15 | Infinity | 0.5963 | | |
| Image Plane | Infinity | | | |

Constituent Lens Data

| Lens | Start Surface | Focal Length |
|---|---|---|
| 1 | 1 | 9.168 |
| 2 | 3 | −9.549 |
| 3 | 6 | 2.366 |
| 4 | 8 | −3.641 |
| 5 | 10 | 128.910 |
| 6 | 12 | 4.636 |

Aspheric Surface Data

| | First Surface | Second Surface | Third Surface | Fourth Surface | Sixth Surface | Seventh Surface |
|---|---|---|---|---|---|---|
| k | −1.000000E+00 | −1.000000E+00 | 0.000000E+00 | 0.000000E+00 | 0.000000E+00 | 5.068538E−01 |
| A4 | 1.763891E−01 | 3.359570E−01 | −2.977206E−01 | −7.316771E−01 | −2.236595E−02 | −1.649370E−01 |
| A6 | −1.708080E−01 | −4.853198E−01 | 4.782700E−01 | 2.349537E+00 | 1.707712E−02 | 5.129118E−02 |
| A8 | 1.668915E−01 | 6.279517E−01 | −1.730987E+00 | −1.061686E+01 | −6.624418E−01 | −1.025262E−01 |
| A10 | −1.153057E−01 | −5.696096E−01 | 3.731013E+00 | 3.413570E+01 | 2.824043E+00 | −8.737474E−01 |
| A12 | 5.062372E−02 | 3.275293E−01 | −4.837674E+00 | −6.841691E+01 | −7.273301E+00 | 3.007893E+00 |
| A14 | −1.249050E−02 | −1.065001E−01 | 3.460509E+00 | 7.536161E+01 | 8.793461E+00 | −4.037129E+00 |
| A16 | 1.305580E−03 | 1.484487E−02 | −1.024471E+00 | −3.344554E+01 | −3.799552E+00 | 2.018630E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | −1.345068E+01 | 0.000000E+00 | 0.000000E+00 | −8.770243E+00 | −7.471994E−01 |
| A4 | −8.640003E−01 | −9.669597E−01 | 7.982182E−01 | 8.476812E−02 | −1.354966E−01 | −2.523680E−01 |
| A6 | 2.647624E+00 | 3.209783E+00 | −8.997266E−01 | 8.003295E−02 | 1.579885E−02 | 1.063391E−01 |
| A8 | −5.424433E+00 | −7.210068E+00 | 4.479297E−01 | 1.914663E−01 | 2.570789E−02 | −3.873070E−02 |
| A10 | 8.665834E+00 | 9.825922E+00 | 6.665476E−03 | −5.266481E−01 | −1.397034E−02 | 9.574203E−03 |
| A12 | −8.094077E+00 | −7.776085E+00 | −1.314307E−01 | 4.565622E−01 | 3.283220E−03 | −1.503917E−03 |
| A14 | 4.172015E+00 | 3.380741E+00 | 5.826676E−02 | −1.735752E−01 | −3.897709E−04 | 1.339639E−04 |
| A16 | −9.417358E−01 | −6.264613E−01 | −4.313557E−03 | 2.507036E−02 | 1.924453E−05 | −5.225081E−06 |

The imaging lens in Example 5 satisfies conditional expressions (1) to (13) as shown in Table 6.

Figure 10:
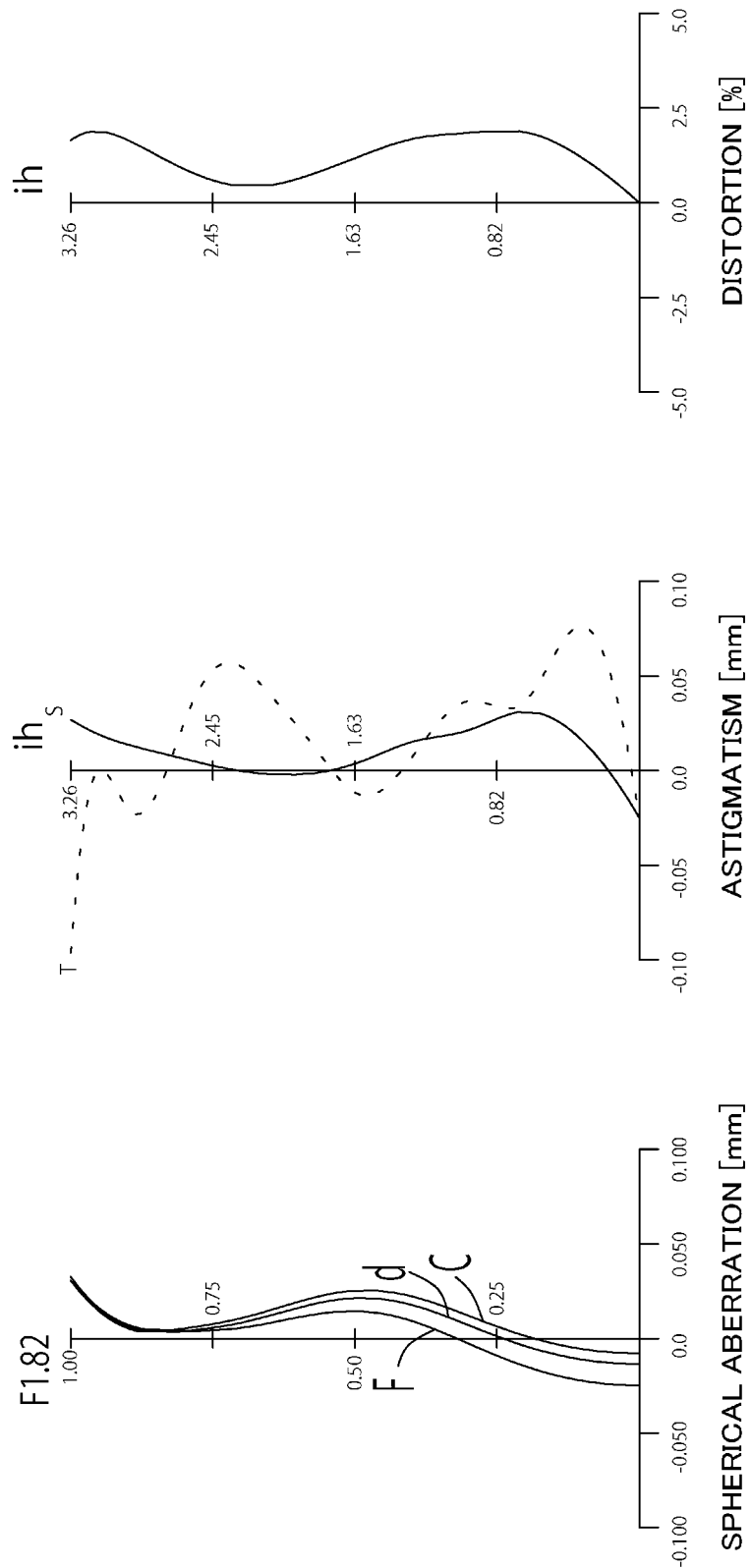
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected excellently.

As shown below, the imaging lens according to the embodiments of the present invention realizes the low-profileness, the wide field of view and the low F-number.

|  | ratio of total track length to diagonal length | field of view (degree) | F-Number |
|---|---|---|---|
| Example 1 | 0.74 | 100.0 | 1.82 |
| Example 2 | 0.74 | 100.0 | 1.82 |
| Example 3 | 0.74 | 99.8 | 1.82 |
| Example 4 | 0.74 | 100.0 | 1.82 |
| Example 5 | 0.73 | 99.8 | 1.82 |

In table 6, values of conditional expressions (1) to (13) related to the Examples 1 to 5 are shown.

| | Conditional Expression | Example 1 | Example 2 | Example 3 | Example 4 | Example 5 |
|---|---|---|---|---|---|---|
| (1) | t23/t34 | 0.81 | 0.82 | 0.89 | 0.89 | 0.90 |
| (2) | (Nd − 1)/r1 | infinity | infinity | −0.14 | −0.10 | −0.12 |
| (3) | (1 − Nd)/r2 | infinity | 0.10 | 0.24 | 0.20 | 0.23 |
| (4) | |f2/f| | 36.07 | 3.20 | 3.60 | 3.63 | 3.56 |
| (5) | f3/f | 0.96 | 0.87 | 0.88 | 0.87 | 0.88 |
| (6) | f4/f | −2.01 | −1.47 | −1.34 | −1.39 | −1.36 |
| (7) | |f5/f| | 18.89 | 25.54 | 24.80 | 27.43 | 48.12 |
| (8) | f6/f | 1.70 | 1.52 | 1.55 | 1.59 | 1.73 |
| (9) | vd2 | 20.37 | 20.37 | 20.37 | 20.37 | 20.37 |
| (10) | |vd3 − vd4| | 35.30 | 35.30 | 35.30 | 35.30 | 35.30 |
| (11) | TTL/2ih | 0.74 | 0.74 | 0.74 | 0.74 | 0.73 |
| (12) | (L1F − L3F)/(L3R − L5R) | 1.00 | 0.98 | 0.96 | 0.95 | 0.95 |
| (13) | EPD/TTL | 0.31 | 0.31 | 0.31 | 0.31 | 0.31 |

When the imaging lens according to the present invention is adapted to a product with camera function, there is realized contribution to low-profileness, wide field of view and low F-number of the camera, and also high performance thereof.

DESCRIPTION OF REFERENCE NUMERALS

STO: aperture stop,
L1: first lens,
L2: second lens,
L3: third lens,
L4: fourth lens,
L5: fifth lens,
L6: sixth lens, and
IMG: image plane

What is claimed is:

1. An imaging lens comprising in order from an object side to an image side:
a first lens being double-sided aspheric lens,
a second lens having positive or negative refractive power,
an aperture stop,
a third lens having positive refractive power,
a fourth lens having at least one aspheric surface and negative refractive power,
a fifth lens having at least one aspheric surface and positive or negative refractive power, and
a sixth lens being double-sided aspheric lens and having positive refractive power, wherein an image-side surface of said sixth lens is a concave surface facing the image side near the optical axis and is formed as the aspheric surface, which changes to the convex surface at an area apart from the optical axis, said fourth lens has a meniscus shape having a concave surface facing the object side near the optical axis, an object-side surface of said first lens is a plane or a concave surface facing the object side near the optical axis, and a conditional expression (9) below is satisfied:

(9) $18 < vd2 < 28$ where
vd2: abbe number at d-ray of the second lens.

2. The imaging lens according to claim 1, wherein the image-side surface of said first lens is plane or the convex surface facing the image side near the optical axis said fourth lens has a meniscus shape having a concave surface facing the object side near the optical axis.

3. The imaging lens according to claim 2, wherein the image-side surface of said first lens is formed as the aspheric surface which changes to the concave surface at the peripheral area.

4. The imaging lens according to claim 1, wherein the object-side surface of said first lens is formed as the aspheric surface which changes to the convex surface at a peripheral area.

5. The imaging lens according to claim 1, wherein
said second lens is a meniscus lens having a concave surface facing the image side near the optical axis,
said third lens has biconvex shape having convex surfaces facing both surfaces near the optical axis,
said fourth lens is a meniscus lens having a concave surface facing the object side near the optical axis, and
said fifth lens is a meniscus lens having a concave surface facing the object side near the optical axis.

6. The imaging lens according to claim 1, wherein said sixth lens has the convex surface facing the object side near the optical axis, and an object-side surface of said sixth lens is formed as the aspheric surface which changes from the convex surface to the concave surface at an area apart from the optical axis.

7. The imaging lens according to claim 1, wherein a conditional expression (1) below is satisfied:

$$0.6 < t23/t34 < 1.6 \qquad (1)$$

where
t23: distance along the optical axis from the image-side surface of the second lens to the object-side surface of the third lens, and
t34: distance along the optical axis from the image-side surface of the third lens to the object-side surface of the fourth lens.

8. The imaging lens according to claim 1, wherein conditional expressions (2) and (3) below are satisfied:

$$-0.3 < (Nd1-1)/r1 < 0.0 \qquad (2)$$

$$0.0 < (1-Nd1)/r2 < 0.3 \qquad (3)$$

where
Nd1: refractive index at d-ray of the first lens,
r1: curvature radius near the optical axis of the object-side surface of the first lens, and
r2: curvature radius near the optical axis of the image-side surface of the first lens.

9. The imaging lens according to claim 1, wherein conditional expressions (4) to (7) below are satisfied:

$$3.0<|f2/f| \tag{4}$$

$$0.5<f3/f<1.5 \tag{5}$$

$$-2.5<f4/f<-0.8 \tag{6}$$

$$|5<|f5/f| \tag{7}$$

where
f: focal length of the overall optical system of the imaging lens,
f2: focal length of the second lens,
f3: focal length of the third lens,
f4: focal length of the fourth lens, and
f5: focal length of the fifth lens.

10. The imaging lens according to claim 1, wherein a conditional expression (8) below is satisfied:

$$1.0<f6/f<2.0 \tag{8}$$

where
f: focal length of the overall optical system of the imaging lens, and
f6: focal length of the sixth lens.

11. The imaging lens according to claim 1, wherein conditional expression (10) below is satisfied:

$$25<|vd3-vd4|<45 \tag{10}$$

where
vd3: abbe number at d-ray of the third lens, and
vd4: abbe number at d-ray of the fourth lens.

12. The imaging lens according to claim 1, wherein a conditional expression (11) below is satisfied:

$$0.6<TTL/2ih<1.0 \tag{11}$$

where
TTL: total track length, and
ih: maximum image height.

* * * * *